Dec. 11, 1956
A. P. RASMUSSEN
2,773,660
FAIL SAFE POWER BOOST SYSTEM
Filed Aug. 20, 1953
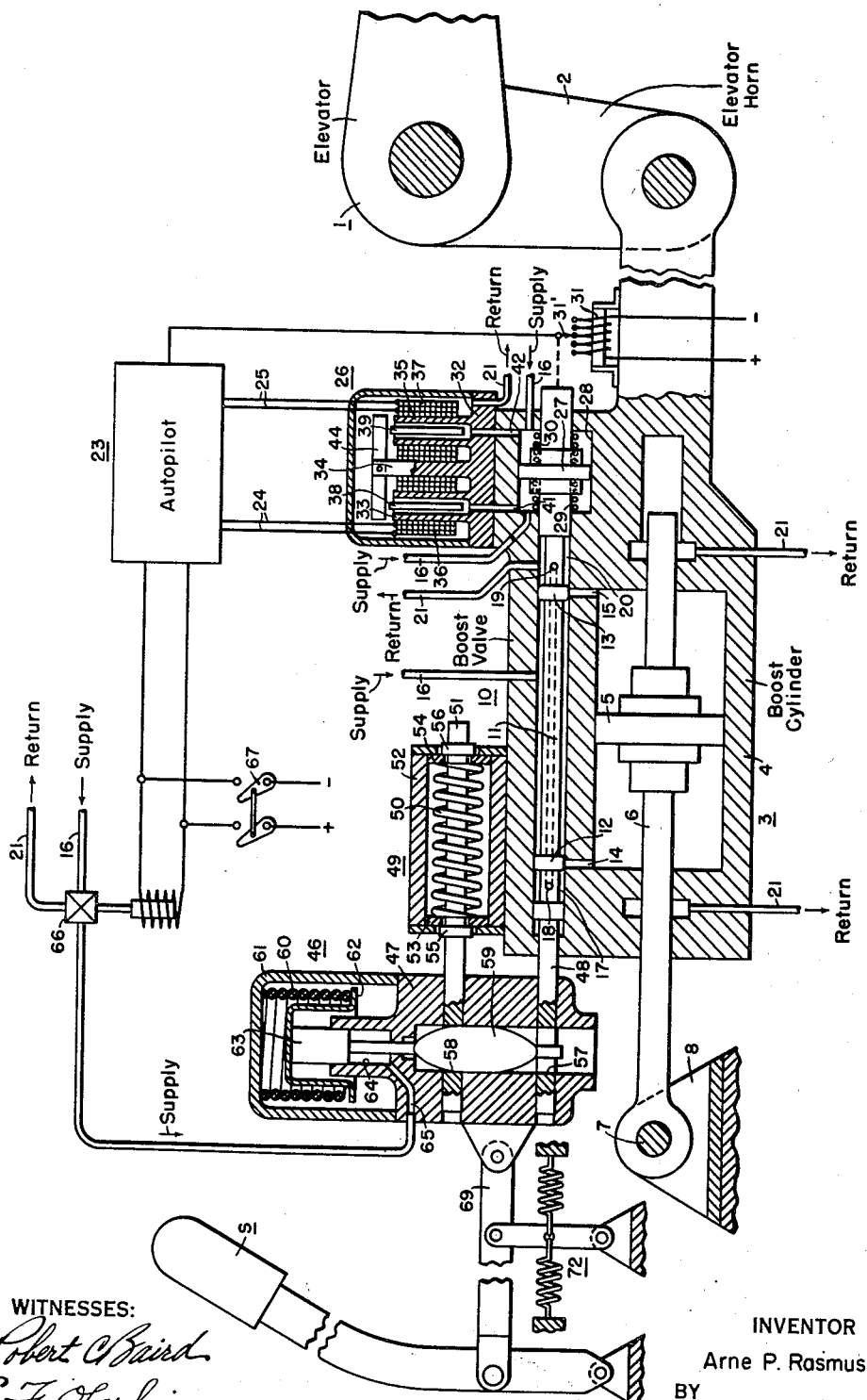
WITNESSES:
Robert C. Baird
E. F. Oberheim
INVENTOR
Arne P. Rasmussen.
BY
Paul E. Friedemann
ATTORNEY United States Patent Office 2,773,660
Patented Dec. 11, 1956

2,773,660

FAIL SAFE POWER BOOST SYSTEM

Arne P. Rasmussen, Glen Burnie, Md., assignor to Westinghouse Electric Corporation, East Pittsburgh, Pa., a corporation of Pennsylvania Application August 20, 1953, Serial No. 375,546

21 Claims. (Cl. 244—85)

This invention relates generally to control systems and more in particular to power boost systems wherein a control of a servo motor from two different sources is required.

An application involving a control of the class noted is in autopilot control surface drives utilizing power boost systems for actuating the control surfaces. Such drives usually embody a boost cylinder controlled by a boost valve under the control of a flight controller or control stick operated by the human pilot.

The application of an autopilot to such a system produces a difficulty in that the autopilot, which is necessarily a low power system, must drive the manually controlled system which is usually spring restrained or loaded. Spring loading is provided in such a system to impart artificial "feel" to control stick deflection so that the pilot feels a stick force increasing with deflection corresponding in a sense, but to a lesser degree, to the force felt when the stick is connected directly to the control surface rather than through the power boost.

One object of this invention is to provide a control system for a servo motor having two sources of control for said motor, which is simple with respect to operational requirements and positive in operation.

Another object of this invention is to provide a control system for a servo motor wherein two sources of control are utilized in controlling said motor in which the power loading of one of said control sources in controlling said motor is minimized.

More specifically, it is an object of this invention to provide a fluid operated booster system for an aircraft which is controllable from two control sources.

Further to the preceding object, it is an object of this invention to provide a control system of the character described wherein both an autopilot and a manual controller are utilized to control a single pilot motor.

In a more specific sense, it is an object of this invention to provide a system of the character described involving a hydraulic actuator and a single valve therefor in which provision is made for controlling said valve from an autopilot and from a manual flight controller.

Further to the preceding object, it is also an object hereof to provide, in the system referred to, hydraulic pressure actuated decoupling in a limited degree between the flight controller and the valve with provision for recoupling in the event of hydraulic pressure failure.

It is also an object of this invention to provide a system of the character described involving a hydraulic actuator and a single control valve therefor in which selective control is provided for resiliently coupling the flight controller to the moving part of the hydraulic actuator in one position and for coupling the flight controller to the valve in a second position.

The foregoing statements are merely illustrative of the various aims and objects of this invention. Other objects and advantages will become apparent upon a study of the following disclosure when considered in conjunction with the accompanying drawing, in which the single figure thereof schematically illustrates a control arrangement embodying the principles of this invention.

The system herein shown schematically illustrates a flight control system for an aircraft involving a hydraulic type of servo system. It is to be appreciated, however, that the principles of this invention are not limited to hydraulic or fluid operated systems, but may be practiced with other types, for example, electric motor arrangements. Further, the illustrated arrangement is applied only in controlling the elevators of an aircraft and has not been extended to the other control surfaces in the interest of simplicity. Again, it will be appreciated by those skilled in the art that these same principles may be applied in arrangements for the other control surfaces.

The elevator control surface 1 is connected to a control horn 2 which is driven by a hydraulic actuator generally designated 3 comprising a cylinder 4 and a piston 5. The piston 5 is mounted on a rod 6 which strokes within bearings in the end of the cylinder 4 and which extends through the left end of the cylinder, as viewed, where it is pivotally anchored at 7 to a stationary pivot support 8 which is secured to some portion of the airframe.

This actuator is controlled by a boost valve generally designated 10 which is mounted on the top side of the cylinder and provided with a slide valve element 11 having a pair of valves 12 and 13 which control the flow of hydraulic fluid through respective ports 14 and 15 in the ends of cylinder 4. Hydraulic fluid under pressure is admitted to the boost valve through a supply conductor 16 which enters the boost valve housing at a point intermediate respective valves 12 and 13.

Therefore, displacement of the slide valve element 11 to the right, for example, closes or seals the valve port 14 from the supply of hydraulic fluid and opens the valve port 15 to the supply. High pressure hydraulic fluid is thereby applied to the right side of piston 5 of the actuator. Since the piston 5 is secured against movement this results in displacement of cylinder 4 to the right, which deflects the elevator 1 upwardly. The diminishing volume on the left side of piston 5 forces hydraulic fluid through the port 14, now functioning as an exhaust port, into a cavity 17 on the left side of valve 12. The fluid is exhausted from cavity 17 by entering a hole 18 in the shaft of the slide valve element 11 which extends longitudinally of this element to a hole 19 on the right of valve 13. At this point, the fluid exhausts into cavity 20 and into the return line 21 of the hydraulic system.

The complete hydraulic system has not been shown to simplify the illustration. However, for the purpose of identification, each supply conductor to the various points of the boost system and each return conductor are respectively numbered 16 and 21. It will be understood from this that the respective supply conductors may be fed from a common supply source, such as a fluid pressure pump which may or may not be connected with an accumulator to produce a supply of hydraulic pressure. Similarly, each of the return lines 21 may be connected to a suitable sump or other hydraulic fluid reservoir for the system from which the hydraulic fluid is drawn by the pump.

Slide valve element 11 is controlled by two different control sources. One of these is represented by the autopilot 23 shown only in block outline, since its details are unimportant to the present invention, and the other is represented in a control stick S which is actuated by the human pilot.

The autopilot may be any one of several suitable types. A preferred type is illustrated in U. S. Patent 2,638,288 to Clinton R. Hanna and assigned to the assignee of this invention. Such an autopilot is capable of producing a pair of differentially related electrical signals which indicate a departure in the desired flight attitude of the aircraft when operating in the cruise mode. This output is represented in respective pairs of electrical conductors 24 and 25 which are utilized to control an electromagnetically operated pilot valve assembly generally designated 26. This pilot valve assembly, in turn, controls the hydraulic pressure on opposite sides of a piston 27 which strokes within a cylinder 28 and which is directly connected to the slide valve element 11 to cause displacement thereof in accordance with the control afforded by the autopilot through the pilot valve assembly. Position feedback is obtained by means of a potentiometer 31 having a tap 31'. As shown, the potentiometer is physically mounted on the boost cylinder housing and moves therewith. Tap 31' is actuated by the slide valve. The potentiometer is energized by a suitable supply of electrical energy, in this case direct current and tap 31' is electrically connected in a feed-back loop with the autopilot. Thus the position of the boost valve element functions to reduce autopilot output. As the aircraft's pitch attitude changes to correct the autopilot detected condition the autopilot output diminishes returning the system to the condition illustrated with the boost valve and elevator neutralized. Spring centering for the assembly of the slide valve element 11 and piston 27 is indicated at the piston in springs 29 and 30. It will be appreciated, however, that spring centering at any convenient point in this assembly may be made. The purpose of centering springs 29 and 30 will be discussed at a later point herein.

The pilot valve assembly comprises a generally E-shaped magnetic core section 32 having upwardly projecting legs 33, 34 and 35. Coils 36 and 37 are concentrically disposed about the outer legs 33 and 35, and these coils are respectively connected to the autopilot output conductors 24 and 25. The pilot valve assembly is provided with a pair of poppet-type valves 38 and 39 which are slidably mounted in longitudinally disposed holes in the respective outer legs 33 and 35. The bottom ends of respective pilot valves 38 and 39 are flat and when fully closed seat over the respective ports 41 and 42 which communicate with the opposite ends of the cylinder 28. Supply lines 16 communicate with opposite ends of cylinder 28. Thus, the hydraulic pressure on opposite sides of piston 27 depends upon the pressure drop at the respective pilot valves which, in turn, depends upon their position. The hydraulic fluid exhausting through ports 41 and 42 into the pilot valve housing is exhausted into the return line 21. The pilot valves are controlled by means of a pivoted armature 44 which is pivotally mounted at the upper end of the center core leg 34 of the assembly and the valves are maintained in contact with this armature by the dynamic force due to fluid impact on the flat bottom ends thereof.

Thus, when the aircraft is in the proper flight attitude, the forces acting on armature 44 are balanced, and the pressures on opposite sides on the piston 27 due to quiescent flow of the fluid are equal. As a result, the piston 27 will occupy a neutral position in which the valves 12 and 13 seal their respective ports 14 and 15, but on a departure from proper flight attitude, the armature is tilted one direction or the reverse which unbalances the pilot valve control, and correspondingly unbalances the hydraulic pressures on opposite sides of the piston 27. Consequently, the actuator cylinder is displaced in one direction or the reverse, correspondingly displacing the elevator to cause a pitch rate in such a sense as to restore the aircraft to the proper flight attitude or to a proper position in elevation depending on the nature of the autopilot control.

The problem which arises in connection with the application of an autopilot to such a system is that in the ordinary case, the slide valve element 11, which represents the output of the autopilot under autopilot control, must drive the control stick S and the linkages connected thereto and any artificial feel devices which may be utilized in the linkage. In the present arrangement, however, maximum advantage is taken of the available output power of the autopilot in driving only the slide valve element, in the autopilot mode of operation, by providing a decoupling linkage, generally designated 46, between the slide valve and the control stick or flight controller linkage. While one form of decoupling linkage has herein been illustrated, it will be appreciated that this invention is not limited to any particular type or to the manner in which it is actuated, but is limited only in the sense that decoupling is provided between such a valve element or servo control device and a controller therefor.

The decoupling linkage 46 is provided with a housing 47 which is slidably mounted over an extension 48 of the slide valve element 11. An overpower bungee device generally designated 49 is mounted on the boost cylinder assembly and is provided with a spring 50 mounted over a link or rod 51 slidably mounted in a housing 52. The spring is restrained between washers 53 and 54 which are slidably fitted over the rod or link 51 and which in the neutral position shown each abut both the ends of the housing 52 and collars 55 and 56 on the rod. This rod is slidably fitted in decoupling linkage housing 47. Slide valve extension 48 and the rod 51 are provided with respective slots 57 and 58 adapted to receive a cam 59 operable between two positions transversely of the respective slots. Cam 59 is biased downwardly by a compression spring 60 which is compressed between a cover 61 and a spring seat 62 mounted on the upper end of piston 63, constituting the hydraulic actuator for the cam, which moves the cam to the position shown in the drawing upon the application of fluid pressure from supply conductor 16. Hydraulic fluid is admitted to and exhausted from the cylinder 64 in which the piston strokes through a port 65, and the application and removal of hydraulic pressure is controlled by means of two position solenoid operated valve 66 which is energized upon closing of a switch 67 used to energize the autopilot system from a suitable electrical power supply. When the valve is energized supply line 16 is connected to cylinder 64 and when the valve is deenergized the cylinder 64 is connected to return line 21. In the arrangement shown, the decoupling linkage housing is connected to a linkage 69, which is only fragmentarily shown, and which connects the housing to the control stick S.

Cam 59 is tapered from its center towards its ends in such a way that when it is displaced into either of its two positions, limited decoupling of slide valve extension 48 or of rod 51 takes place. For example, when the autopilot is de-energized, the solenoid valve is de-energized. This connects cylinder 64 to return line 21 and exhausts the cylinder. Spring 60, therefore, drives the cam 59 to its lowermost position, in which position the cam fills the slot 57 and directly couples the slide valve element to the stick. Thus, the system is enabled for manually operated boost control and the spring loaded rod 51 is effectively decoupled from the stick over the full range of slide valve displacement from one limit to the other. Under these conditions, a degree of stiffness from stick movement to neutral position is provided entirely by the artificial feel device 72. Any displacement of the stick from neutral position shifts the slide valve assembly correspondingly causing displacement of the boost cylinder to actuate the elevator. This action continues until the boost cylinder catches up with the slide valve which closes the ports 14 and 15 and holds the cylinder in that particular position. Thus, the rate of displacement of the elevator and its ultimate position depend upon the rate of displacement of the stick and the final position of the stick.

If the autopilot is to be used to control the boost system, the switch 67 is closed energizing the autopilot and applying hydraulic pressure to the piston 63 which moves the cam 59 to the position illustrated. In this position, the cam fills the slot 58 in rod 51 and couples the stick directly to the boost cylinder through the overpower bungee 49. At the same time, the slide valve element 11 is decoupled from the control stick over the full range of displacement of the slide valve element. Thus, the autopilot control valve displaces the slide valve element without hindrance from the flight controller mechanism.

However, provision still exists whereby the pilot may at any time he desires over-ride the autopilot control. This is done by applying sufficient force on the stick to overcome the artificial feel device 72 and the overpower bungee 49. This displaces the housing of the decoupling linkage along the slide valve extension 48, and when the lost motion is taken up, the lower end of cam 59 contacts the end of the slot 57 and drives the slide valve assembly in the direction of stick movement. The function here is the same as previously described in connection with manually operated boost control. But in this case centering springs 29 and 30 provide the force which returns the slide valve to neutral, or, viewed otherwise, maintains the slide valve in engagement with the abutting face of cam 59, as the cylinder moves, which neutralizes the boost valve. The arrangement therefore functions as a position control with the centering springs 29 and 30 operating to close the position loop during overpowering control from the stick. Additionally, in the event of failure of the decoupling linkage during the power boost mode of operation the centering springs provide a means for neutralizing the boost valve to stop the control.

It will be appreciated that this invention represents a unique solution to the problem of controlling a servo system from two separate sources, wherein one of the sources is a relatively low power output device. The specific components whereby this has been accomplished have been illustrated for the purpose of presenting one operable arrangement and it is not to be construed that the system is limited in any way to the specific arrangement illustrated, since the system may be modified both as to its details and as to its organization without departing from the spirit and scope hereof. Accordingly, it is intended that the foregoing disclosure and the showing made in the drawing shall be considered only as illustrative of the principles of this invention and are not to be interpreted in a limiting sense.

I claim as my invention:

1. Control apparatus comprising, motor means having a stationary part and a movable member, movable control means mounted on said movable member for controlling the flow of a power medium to said motor means to operate said motor means, first control means having an output member mounted on said movable member and connected to move said movable control means, second control means, a two position spring-loaded decoupling linkage operable in spring-loaded position to connect said second control means to said movable control means, and means for operating said decoupling linkage to its second position to disconnect said second control means and said movable control means.

2. Control apparatus comprising, motor means having a stationary part and a movable member, movable control means mounted on said movable member for controlling the flow of a power medium to said motor means to operate said motor means, first control means having an output member mounted on said movable member and connected to move said movable control means, a link resiliently connected to said movable member, second control means, and a two position decoupling linkage operable in one position to connect said second control means to said link and operable in a second position to connect said second control means to said movable control means.

3. Hydraulic control means comprising, a hydraulic actuator having a stationary part and a movable part, a valve mounted on said movable part and having a movable valve member for controlling the flow of hydraulic fluid to said hydraulic actuator, first control means having a connection with said movable valve member for effecting movement thereof, second control means, and a two position spring-loaded decoupling linkage operable in its spring-loaded position to connect said second control means to said movable valve member and operable in its second position to disconnect said second control means from said movable valve member.

4. Hydraulic control means comprising, a hydraulic actuator having a stationary part and a movable part, a valve mounted on said movable part and having a movable valve member for controlling the flow of hydraulic fluid to said hydraulic actuator, first control means having a connection with said movable valve member for effecting movement thereof, a link resiliently connected to said movable part of said hydraulic actuator, second control means, and a decoupling linkage selectively connecting said link and said movable valve member to said second control means.

5. Hydraulic control means comprising, a main hydraulic actuator having a stationary part and a movable part, a valve mounted on said movable part and having a movable valve member for controlling the flow of main hydraulic fluid to said hydraulic actuator, an auxiliary hydraulic actuator mounted on said movable part of said main hydraulic actuator and having piston connected with said movable valve member, a control valve connected with said auxiliary hydraulic actuator to control the flow of hydraulic fluid thereto, a movable controller, and a two position decoupling linkage operable in one position to connect said movable controller to said movable valve member and operable in a second position to disconnect said movable controller from said movable valve member.

6. Hydraulic control means comprising, a main hydraulic actuator having a stationary part and a movable part, a valve mounted on said movable part and having a movable valve member for controlling the flow of main hydraulic fluid to said hydraulic actuator, an auxiliary hydraulic actuator mounted on said movable part of said main hydraulic actuator and having a piston connected with said movable valve member, a control valve connected with said auxiliary hydraulic actuator to control the flow of hydraulic fluid thereto, a link resiliently connected to said movable part of said main hydraulic actuator, a movable controller, and a decoupling linkage selectively connecting said link and said movable valve member to said movable controller.

7. Hydraulic control means comprising, a main fluid motor having a stationary piston rod and a movable cylinder, a boost valve mounted on said movable cylinder and having a movable valve member for controlling hydraulic pressure in said main fluid motor, an auxiliary fluid motor having a cylinder mounted on said movable cylinder and having a piston connected to said movable valve member, a control valve connected with said auxiliary fluid motor for controlling hydraulic pressure therein, a movable controller, and a lost motion linkage connecting said movable controller to said movable valve member, the lost motion of said linkage being substantially equal to the travel of said movable valve member.

8. Hydraulic control means comprising, a main fluid motor having a stationary piston rod and a movable cylinder, a boost valve mounted on said movable cylinder and having a movable valve member for controlling hydraulic pressure in said main fluid motor, an auxiliary fluid motor having a cylinder mounted on said movable cylinder and having a piston connected to said movable valve member, a control valve connected with said auxiliary fluid motor for controlling hydraulic pressure therein, a link resiliently connected to said power cylinder, a movable controller, and a two position decoupling linkage selectively connecting said link and said movable valve member to said movable controller.

9. Hydraulic control means comprising, a main fluid motor having a stationary piston rod and a movable cylinder, a boost valve mounted on said movable cylinder and having a movable valve member for controlling hydraulic pressure in said main fluid motor, an auxiliary fluid motor having a cylinder mounted on said movable cylinder and having a piston connected to said movable valve member, a control valve connected with said auxiliary fluid motor for controlling hydraulic pressure therein, a link resiliently connected to said movable cylinder, a movable controller, a two position decoupling linkage selectively connecting said link and said movable valve member to said movable controller, and means for actuating said decoupling linkage between said two positions comprising a hydraulic piston for moving said decoupling linkage to one position and a spring biasing said decoupling linkage to the other position.

10. Hydraulic control means comprising, a main fluid motor having a stationary piston rod and a movable cylinder, a boost valve mounted on said movable cylinder and having a movable valve member for controlling hydraulic pressure in said main fluid motor, an auxiliary fluid motor mounted on said movable cylinder and having a piston connected to said movable valve member, a control valve connected with said auxiliary fluid motor for controlling hydraulic pressure therein, a link resiliently connected to said movable cylinder, a movable controller, a decoupling device having a housing slidably mounted on said link and said movable valve member, said link and said movable valve member each having a slot therein, a movable cam movably connected to said housing, said cam in one position engaging the slot in said movable valve member and releasing the slot in said link and in a second position said cam engaging the slot in said link and releasing the slot in said movable valve member, spring means biasing said cam to said one position, hydraulic means for moving said cam to said second position, and means connecting said movable controller to said decoupling device.

11. In a system for controlling the maneuver control means of an aircraft, the combination of, motor means having a moving part connected with said maneuver control means for effecting operation thereof, movable control means mounted on said moving part for controlling the flow of a power medium to said motor means, first control means having an output member on said moving part and connected with said movable control means for controlling said movable control means, second control means, a two position spring-loaded decoupling linkage operable in spring-loaded position to connect said second control means to said movable control means, and means for operating said decoupling linkage to its second position to disconnect said second control means and said movable control means.

12. In a system for controlling the maneuver control means of an aircraft, the combination of, motor means having a moving part connected with said maneuver control means for effecting operation thereof, movable control means mounted on said moving part for controlling the flow of a power medium to said motor means, auxiliary motor means on said moving part and connected with said movable control means to effect operation thereof, an automatic pilot connected with said auxiliary motor means for controlling the flow of a power medium thereto, a flight controller, and a lost motion linkage connecting said flight controller to said movable control means.

13. In a system for controlling the maneuver control means of an aircraft, the combination of, motor means having a moving part connected with said maneuver control means for effecting operation thereof, movable control means mounted on said moving part for controlling the flow of a power medium to said motor means, auxiliary motor means on said moving part and connected with said movable control means to effect operation thereof, an automatic pilot connected with said auxiliary motor means for controlling the flow of a power medium thereto, a link resiliently connected to said moving part of said motor means, a flight controller, and a decoupling linkage selectively connecting said movable control means and said link to said flight controller.

14. In a system for controlling the maneuver control means of an aircraft, the combination of, motor means having a moving part connected with said maneuver control means for effecting operation thereof, movable control means mounted on said moving part for controlling the flow of a power medium to said motor means, auxiliary motor means on said moving part and connected with said movable control means to effect operation thereof, an automatic pilot connected with said auxiliary motor means for controlling the flow of a power medium thereto, a link resiliently connected to said moving part of said motor means, a flight controller, a decoupling linkage connected to said flight controller and having a movable latch mechanically biased to a first position engaging said movable control means and responsive to said power medium for movement to a second position releasing said movable control means and engaging said link.

15. Flight control apparatus for controlling a control surface of an aircraft comprising, a fluid operated actuator having a moving part connected to said control surface, valve means mounted on said moving part of said actuator and having a movable valve element for controlling fluid pressure in said fluid operated actuator, an autopilot having an output member connected to said movable valve element to cause movement thereof, a flight controller, and a two position spring-loaded, fluid-operated decoupling linkage disposed between said valve element and said flight controller, said decoupling linkage being operable in spring-loaded position to connect said valve element and flight controller and being operable in hydraulically operated position to disconnect said valve element and flight controller.

16. Flight control apparatus for controlling a control surface of an aircraft comprising, a fluid operated actuator having a moving part connected to said control surface, valve means mounted on said moving part of said actuator and having a movable valve element for controlling fluid pressure in said fluid operated actuator, and autopilot having an output member connected to said movable valve element to cause movement thereof, a flight controller, a decoupling linkage having a movable cam, a cooperating part on said movable valve element engageable with said movable cam, a resilient member in said decoupling linkage biasing said movable cam to a position engaging and locking said cooperating part, and fluid operated means connected with said movable cam to effect displacement thereof against said resilient member to effect loose engagement between said cam and said cooperating part.

17. Flight control apparatus for controlling a control surface of an aircraft comprising, a fluid operated actuator having a moving part connected to said control surface, valve means mounted on said moving part of said actuator and having a movable valve element for controlling fluid pressure in said fluid operated actuator, an autopilot having an output member connected to said movable valve element to cause movement thereof, a decoupling linkage comprising a cam movable between two positions, resilient means biasing said cam to one position, fluid operated means connected to said cam and moving said cam to a second position against said resilient member, a link resiliently connected to said moving part of said actuator, cooperating cam parts on said link and said moving valve element, said cam in said one position loosely engaging said cooperating part of said link and tightly engaging said cooperating part of said movable valve element and in said second position said cam loosely engaging said cooperating part of said movable valve element and tightly engaging said cooperating part of said link, and a flight controller connected to said decoupling linkage.

18. A hydraulic booster control for an aircraft comprising, a hydraulic actuator having a moving part adapted for connection to a control surface of said aircraft, a boost valve mounted on said moving part of said actuator and having a movable valve element for controlling the flow of hydraulic fluid to said actuator, an automatic pilot having an output member connected to said movable valve element for controlling movement thereof, a flight controller, a two position decoupling linkage comprising a movable locking element operable in one position to directly connect said flight controller and said movable valve element and operable in a second position to introduce lost motion in the connection between said flight controller and said movable valve element in a degree corresponding to the travel of said valve element, resilient means biasing said locking element to said one position and hydraulic means connected with said locking element for moving said locking element to said second position.

19. A hydraulic booster control for an aircraft comprising, a hydraulic actuator having a moving part adapted for connection to a control surface of said aircraft, a boost valve mounted on said moving part of said actuator and having a movable valve element for controlling the flow of hydraulic fluid to said actuator, a cylinder on said moving part of said actuator and having a piston connected to said movable valve element, an electromagnetically operated control valve connected to said cylinder for controlling hydraulic pressure therein, an autopilot connected to said control valve, a flight controller, a two position decoupling linkage comprising a movable locking element operable in one position to directly connect said flight controller and said movable valve element and operable in a second position to introduce lost motion in the connection between said flight controller and said movable valve element in a degree corresponding to the travel of said valve element, resilient means biasing said locking element to said one position and hydraulic means connected with said locking element for moving said locking element to said second position.

20. A hydraulic booster control for an aircraft comprising, a hydraulic actuator having a moving part adapted for connection to a control surface of said aircraft, a boost valve mounted on said moving part of said actuator and having a movable valve element connected to said actuator for controlling the flow of hydraulic fluid thereto, an autopilot having an output member connected to said movable valve element for controlling movement thereof, a link resiliently mounted on said moving part of said actuator, a flight controller, a decoupling linkage slidably mounted on said link and said movable valve element and connected with said flight controller to be moved thereby, a locking device movably mounted in said decoupling linkage, said locking device being operable in one position to snugly engage said movable valve element while loosely engaging said link and being operable in a second position to loosely engage said movable valve element and to snugly engage said link, resilient means biasing said locking device to said one position, and hydraulic pressure responsive means connected to said locking device for biasing said locking device against said resilient means to said second position.

21. A hydraulic booster control for an aircraft comprising, a hydraulic actuator having a moving part adapted for connection to a control surface of said aircraft, a boost valve mounted on said moving part of said actuator and having a movable valve element connected to said actuator for controlling the flow of hydraulic fluid thereto, a cylinder on said moving part of said movable valve element, an electromagnetically operated control valve connected to said cylinder for controlling hydraulic pressure therein, an autopilot connected to said control valve, a link resiliently mounted on said moving part of said actuator, a flight controller, a decoupling linkage slidably mounted on said link and said movable valve element and connected with said flight controller to be moved thereby, a locking device movably mounted in said decoupling linkage, said locking device being operable in one position to snugly engage said movable valve element while loosely engaging said link and being operable in a second position to loosely engage said movable valve element and to snugly engage said link, resilient means biasing said locking device to said one position, and hydraulic pressure responsive means connected to said locking device for biasing said locking device against said resilient means to said second position.

References Cited in the file of this patent

UNITED STATES PATENTS

| | | |
|---|---|---|
| 588,946 | Bergman | Aug. 31, 1897 |
| 1,628,603 | Ferris | May 10, 1927 |
| 2,487,116 | Eaton | Nov. 8, 1949 |
| 2,621,872 | Terdina et al. | Dec. 16, 1952 |
| 2,646,947 | Kutzler et al. | July 28, 1953 |
| 2,672,307 | Cook et al. | Mar. 16, 1954 |

FOREIGN PATENTS

| | | |
|---|---|---|
| 453,928 | Great Britain | 1936 |